(12) United States Patent
Dong

(10) Patent No.: US 6,725,314 B1
(45) Date of Patent: Apr. 20, 2004

(54) MULTI-BANK MEMORY SUBSYSTEM EMPLOYING AN ARRANGEMENT OF MULTIPLE MEMORY MODULES

(75) Inventor: Lam S. Dong, Union City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 487 days.

(21) Appl. No.: 09/823,540

(22) Filed: Mar. 30, 2001

(51) Int. Cl.[7] .................................................. G06F 13/00
(52) U.S. Cl. ....................................................... 710/305
(58) Field of Search .......................... 710/62, 100, 305; 326/90; 361/788; 365/230.03; 711/173

(56) References Cited

U.S. PATENT DOCUMENTS

| | | | |
|---|---|---|---|
| 4,025,903 A | | 5/1977 | Kaufman et al. |
| 5,228,132 A | | 7/1993 | Neal et al. |
| 5,265,218 A | | 11/1993 | Testa et al. |
| 5,270,964 A | | 12/1993 | Bechtolsheim et al. |
| 5,530,623 A | * | 6/1996 | Sanwo et al. ............... 361/788 |
| 5,796,672 A | * | 8/1998 | Pitz et al. ............... 365/230.03 |
| 6,202,110 B1 | | 3/2001 | Coteus et al. |
| 6,209,056 B1 | | 3/2001 | Suh |
| 2002/0109528 A1 | * | 8/2002 | Toda ........................... 326/90 |

FOREIGN PATENT DOCUMENTS

GB     2226665     12/1988

OTHER PUBLICATIONS

International search report application No. PCT/US02/10563 mailed Sep. 26, 2002.

* cited by examiner

*Primary Examiner*—Xuan M. Thai
(74) *Attorney, Agent, or Firm*—Meyertons Hood Kivlin Kowert & Goetzel, P.C.; B. Noël Kivlin

(57) ABSTRACT

A multi-bank memory subsystem employing multiple memory modules. A memory subsystem includes a memory controller coupled to a memory bus. The memory bus includes a plurality of data paths each corresponding to a separate grouping of data lines. The memory bus is coupled to a first plurality of memory modules corresponding to a first memory bank. The first memory bank corresponding to a first range of addresses. The memory bus is also coupled to a second plurality of memory modules corresponding to a second memory bank. The second memory bank corresponding to a second range of addresses. A separate memory module of each of the first and the second memory banks is coupled to each data path of the memory bus. Memory modules that are coupled to the same data path are located adjacent to one another without any intervening memory modules coupled to other data paths.

12 Claims, 4 Drawing Sheets

MULTI-BANK MEMORY SUBSYSTEM EMPLOYING AN ARRANGEMENT OF MULTIPLE MEMORY MODULES

BACKGROUND OF THE INVENTION

1. Field of the Invention

This invention relates to memory subsystems and, more particularly, to memory module placement on a memory bus.

2. Description of the Related Art

Memory modules and their corresponding connector sockets for expanding memory within computer systems and other data processing systems are well known. Generally speaking, in-line memory modules include a printed circuit board on which a plurality of memory chips such as dynamic random access memories (DRAMs) are surface mounted. A connective portion along one edge of the printed circuit board is adapted for insertion into a mating (i.e. accommodating) space of a connector. A plurality of contact pads (also called pins) on the connective portion mates with a plurality of corresponding contacts inside the accommodating space of the connector to provide for the transfer of electrical signals between the memory module and the rest of the computer or data processing system.

Two commonly used memory modules are single in-line memory modules (SIMMs) and dual in-line memory modules (DIMMs). On a SIMM, the connective portion usually includes a plurality of contact pads on either the front side of the edge of the printed circuit board or on both the front and back sides of the printed circuit board. In configurations that include contact pads on both the front and back sides of a SIMM, opposing contact pads on the two sides are typically shorted together and therefore carrying the same electrical signal. On a DIMM, the contacts are positioned in the connective portion on both the front and back sides of the printed circuit board. At least some of the opposing contact pads on the two sides of the printed circuit board of a DIMM are configured to carry differing electrical signals, thereby increasing the signal density without necessitating smaller contact pads or a larger printed circuit board.

In many systems, the memory module connectors are mounted on a motherboard or system board such that the memory modules connect to a memory bus one row after another or in a daisy chain. For systems containing a small number of memory modules, or a narrow data bus, the daisy chain configuration may not present any problems. However, as described in greater detail below in conjunction with FIG. 1, in systems with a wide data bus and with many memory modules, a daisy chain configuration may present problems.

Turning to FIG. 1, a diagram of one embodiment of a memory subsystem configuration using a wide data bus is shown. A processor 10 is coupled to a memory controller 20 through a system bus 15. Memory controller 20 is coupled to memory modules 25–28A and 25–28B through a memory bus 25.

In the illustrated embodiment, memory bus 25 includes a data bus which contains 576 data lines. The 576 data lines are subdivided into data paths of 144 lines each. Memory modules 25–28A and 25–28B are arranged to form two memory banks: A and B, respectively. Each memory bank is associated with a particular range of addresses in memory. Each memory module is associated with a particular data path. For example, in memory bank A: Memory module 25A is coupled to data path 1, lines 0–143. Memory module 26A is coupled to data path 2, lines 144–287. Memory module 27A is coupled to data path 3, lines 288–431. Memory module 28A is coupled to data path 4, lines 432–575. Thus, when memory bank A is enabled 25–28A may be accessed to store a data word containing all 576 data bits.

Likewise, in memory bank B: Memory module 25B is coupled to data path 1, lines 0–143. Memory module 26B is coupled to data path 2, lines 144–287. Memory module 27B is coupled to data path 3, lines 288–431. Memory module 28B is coupled to data path 4, lines 432–575. Thus when memory bank B is enabled, memory modules 25–28B may be accessed to store a data word containing all 576 data bits. Typically, only one memory bank is enabled at a time.

As shown in FIG. 1, memory modules 25–28A are closer to memory controller 20 than memory modules 25–28B. If an additional memory bank were added, it would be further still from memory controller 20. One problem with this topology is signal degradation on the data paths. In this topology, a given data path is routed to a corresponding memory module of each memory bank. Thus, the respective signals may be reflected and distorted as the distance between memory modules coupled to the same data path is increased. In addition, signal timing to each memory bank may be difficult to control since the length of a data path from the memory controller to one memory bank may be significantly different than the length of the same data path to a different memory bank. While two memory banks are shown in FIG. 1, it is noted that other embodiments may have more memory banks. In such embodiments, additional signal degradation may be experienced.

SUMMARY OF THE INVENTION

Various embodiments of a multiple bank memory subsystem employing multiple memory modules are disclosed. In one embodiment, a data processing system may include a processor coupled to a memory subsystem. The memory subsystem includes a memory controller coupled to a memory bus. The memory bus includes a plurality of data paths each corresponding to a separate grouping of data lines. The memory bus is coupled to a first plurality of memory modules that provide storage corresponding to a first memory bank. The first memory bank is configured to store data corresponding to a first range of addresses. The memory bus is also coupled to a second plurality of memory modules that provide storage corresponding to a second memory bank. The second memory bank is configured to store data corresponding to a second range of addresses. A separate memory module of each of the first and the second memory banks is coupled to each data path of the memory bus. Memory modules that are coupled to the same data path are located adjacent to one another without any intervening memory modules coupled to other data paths.

Figure 1:
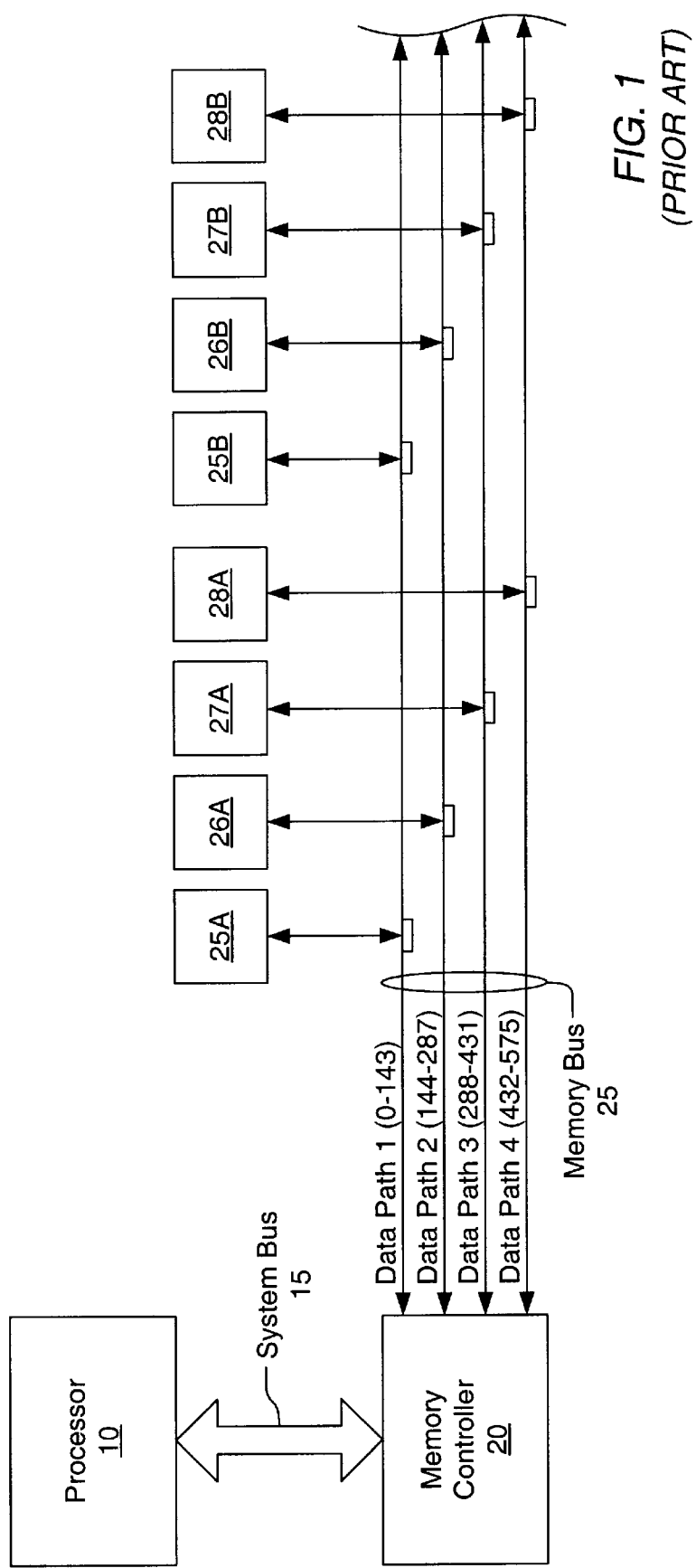
FIG. 1 is a diagram of one embodiment of a memory subsystem configuration using a wide data bus.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
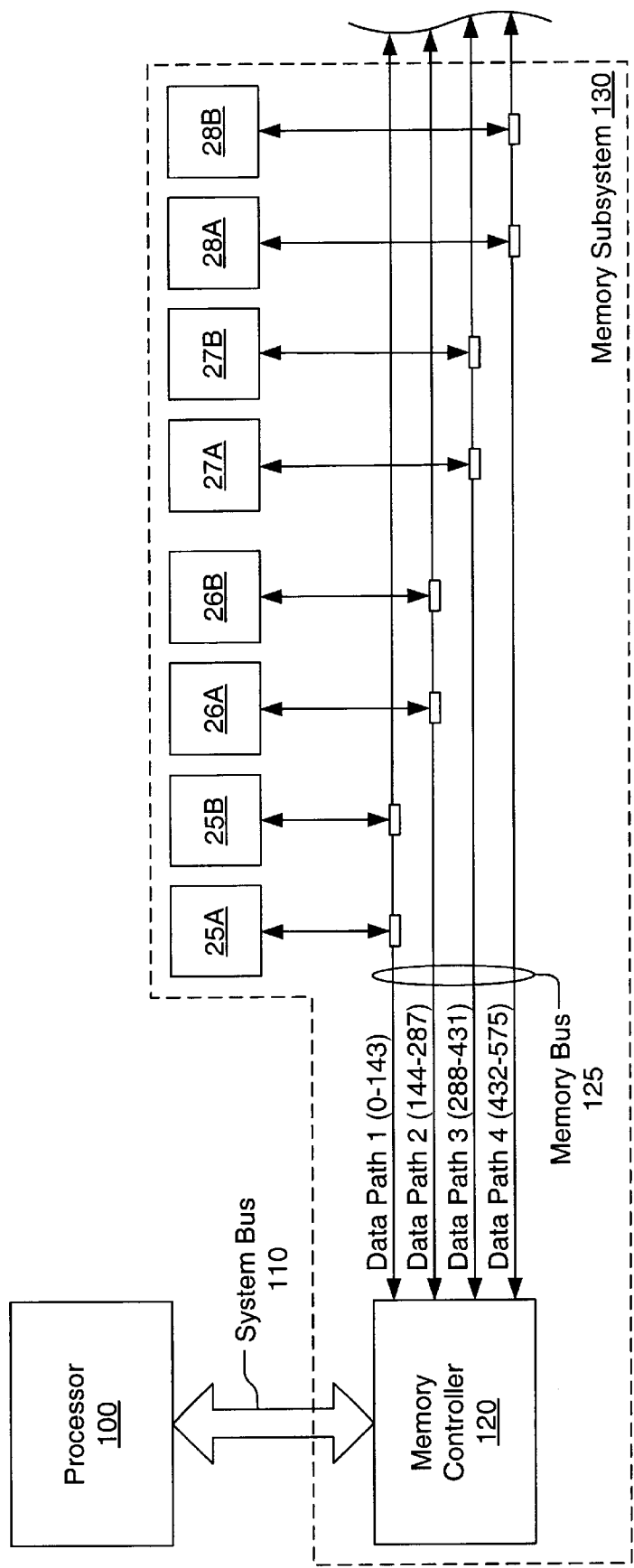
FIG. 2 is a diagram of one embodiment of data processing system including a memory subsystem.

Turning now to FIG. 2, a diagram of one embodiment of a data processing system including a memory subsystem is shown. The data processing system includes a processor 100 coupled to a memory subsystem 130 through a system bus 110. Processor 100 may execute software instructions that cause data to be stored in or retrieved from memory subsystem 130. Memory subsystem 130 includes a memory controller 120 coupled to memory modules 25–28A and 25–28B through a memory bus 125. The illustrated data processing system is only one example of a data processing system. It is contemplated that the data processing system may be a personal computer, a workstation or a network router for example.

Similar to the embodiment of FIG. 1, memory bus 125 of FIG. 2 includes a data bus which contains 576 data lines. The 576 data lines are subdivided into four data paths of 144 lines each. This particular data bus topology is sometimes referred to as a wide data bus. It is noted that in other embodiments, more or less data lines may be used and the data paths may contain different numbers of data lines.

Memory modules 25–28A and 25–28B are arranged to form two memory banks: A and B, respectively. Memory modules 25–28A correspond to memory bank A and memory modules 25–28B correspond to memory bank B. Each memory bank is associated with a particular range of addresses in memory. Each memory module is associated with a data path. For example, in memory bank A: Memory module 25A is coupled to data path 1, lines 0–143. Memory module 26A is coupled to data path 2, lines 144–287. Memory module 27A is coupled to data path 3, lines 288–431. Memory module 28A is coupled to data path 4, lines 432–575. Thus, when memory bank A is enabled 25–28A may be accessed to store a data word containing all 576 data bits.

The logical arrangement of the memory modules is similar to the prior art of FIG. 1. However in FIG. 2, the physical location and placement of the memory modules on memory bus 125 is different. In FIG. 2, the memory modules of each bank are interleaved such that a memory module connected to a particular data path on memory bus 125 is located adjacent to other memory modules connected to the same data path on memory bus 125. Further, no memory modules that are connected to a different data path may be between the memory modules connected to the same data path. This is shown more clearly in FIG. 3. It is noted that other embodiments may contain more or less memory modules and that the memory banks may be configured using different numbers of memory modules.

Figure 3:
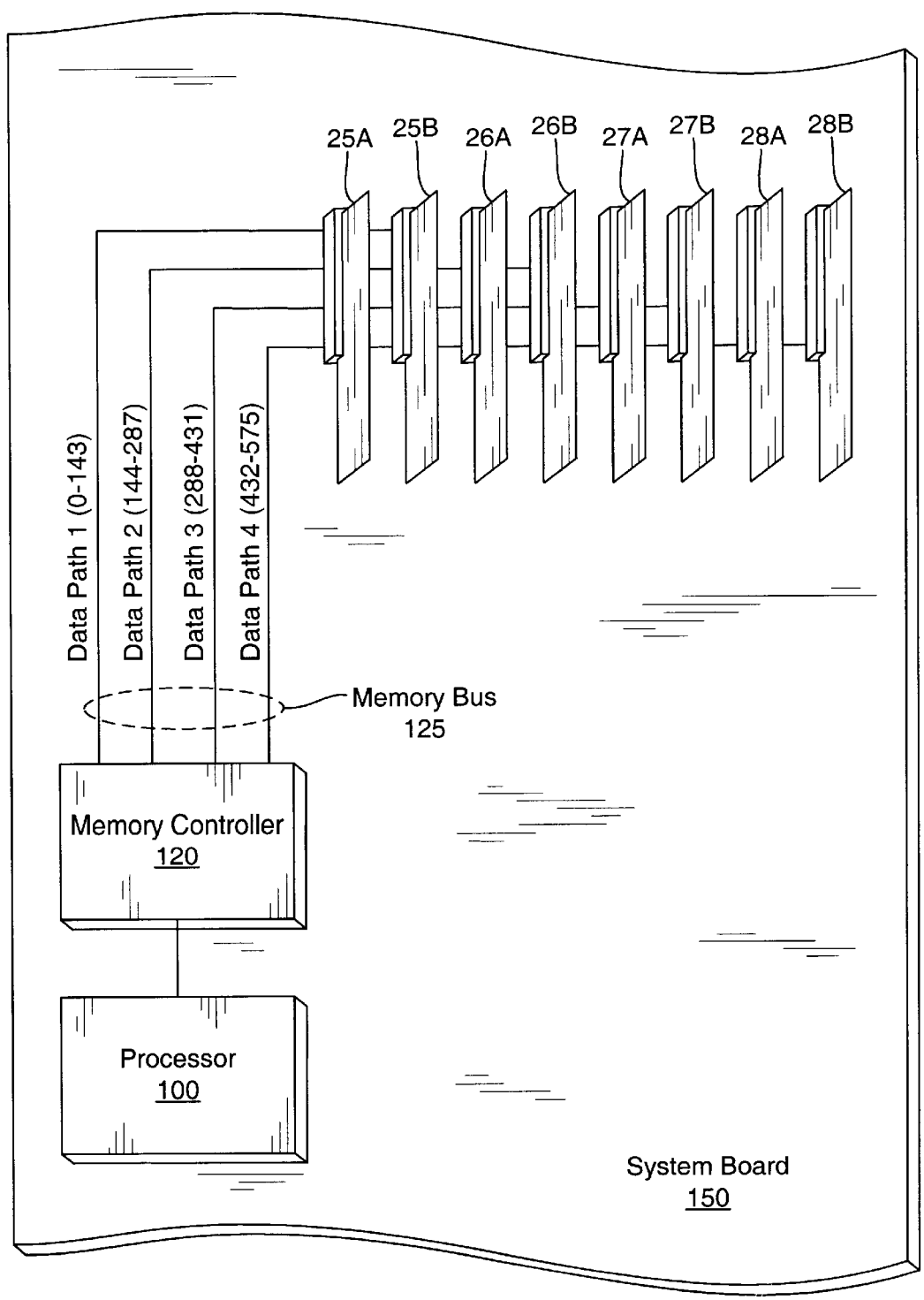
FIG. 3 is a perspective view of one embodiment of the physical placement of memory modules on a system board.

Referring to FIG. 3, a perspective view of one embodiment of the physical placement of memory modules on a system board is shown. Diagram components that correspond to those shown in FIG. 2 are numbered identically for simplicity and clarity. A system board 150 includes a processor 100, a memory controller 120 and a memory bus 125 coupled to memory modules 25–28A and 25–28B. The memory modules are inserted into connectors or sockets which are mounted to the system board.

As described above in conjunction with FIG. 2, memory modules that are coupled to the same data path are located adjacent to each other with no intervening memory modules that are coupled to other data paths.

For example, memory module 25A of bank A and memory module 25B of bank B are both coupled to data path 1 and adjacent to one another. Memory module 26A of bank A and memory module 26B of bank B are both coupled to data path 2 and adjacent to one another. Memory module 27A of bank A and memory module 27B of bank B are both coupled to data path 3 and adjacent to one another. Memory module 28A of bank A and memory module 28B of bank B are both coupled to data path 4 and adjacent to one another.

Figure 4:
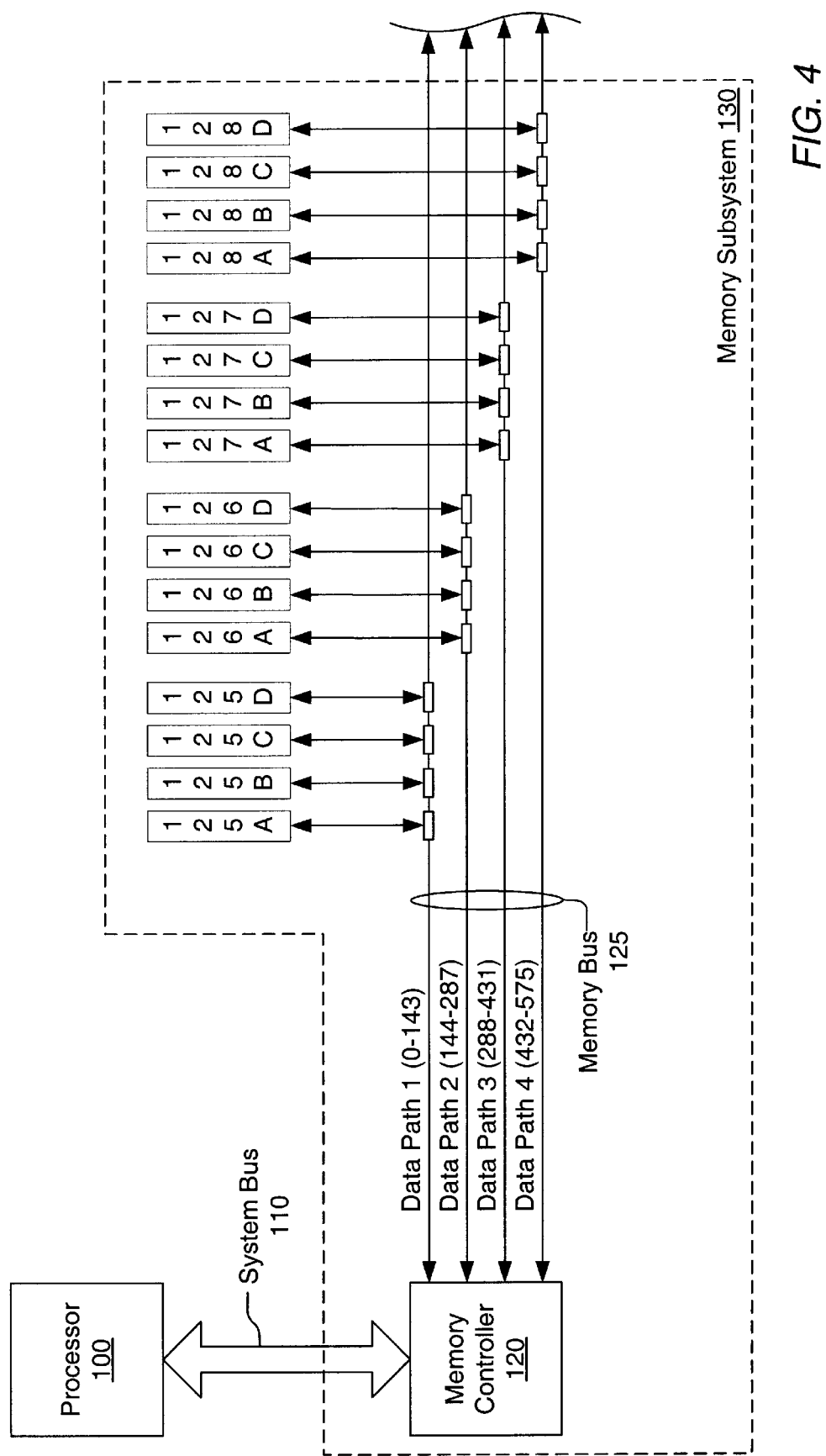
FIG. 4 is a diagram of another embodiment of data processing system including a memory subsystem.

Referring to FIG. 4, a diagram of another embodiment of a data processing system including a memory subsystem is shown. Diagram components that correspond to those shown in FIG. 2 and FIG. 3 are numbered identically for simplicity and clarity.

Similar to the embodiment of FIG. 2, the data processing system illustrated in FIG. 4 also includes a processor 100 coupled to a memory subsystem 130 through a system bus 110. Memory subsystem 130 includes a memory controller 120 coupled to a plurality of memory modules through a memory bus 125. However in FIG. 4 there are additional memory modules which create two additional memory banks: C and D. Thus in FIG. 4 memory modules 125–128A are arranged to form bank A, memory modules 125–128B are arranged to form bank B, memory modules 125–128C are arranged to form bank C and memory modules 125–128D are arranged to form bank D.

The logical and physical arrangement of the memory modules in FIG. 4 is similar to the arrangement shown in FIG. 2. The memory modules of each bank in FIG. 4 are interleaved such that a memory module connected to a particular data path on memory bus 125 is adjacent to memory modules connected to the same data path. Further, no memory modules that are connected to a different data path may be between the memory modules connected to the same data path.

The arrangement of memory modules as described in the systems of FIG. 2 through FIG. 4 may allow for improved signal quality due to less signal reflection. In addition, signal timing may be improved since the memory modules connected to the same data path may use the same signal timing.

Numerous variations and modifications will become apparent to those skilled in the art once the above disclosure is fully appreciated. It is intended that the following claims be interpreted to embrace all such variations and modifications.

What is claimed is:

1. A memory subsystem comprising:
   a memory controller unit;
   a memory bus coupled to said memory controller unit, wherein said memory bus includes a plurality of data paths each corresponding to a separate grouping of data lines associated with said memory;
   a first memory module and a second memory module coupled to said memory bus that provide storage corresponding to a first memory bank, wherein said first memory bank is configured to store data corresponding to a first range of addresses; and
   a third memory module and a fourth memory module coupled to said memory bus that provide storage corresponding to a second memory bank, wherein said second memory bank is configured to store data corresponding to a second range of addresses;

wherein said first memory module and said third memory module are coupled to a first data path of said memory bus and said second memory module and said fourth memory module are coupled a second data path of said memory bus; and wherein said first and said third memory modules are located adjacent to one another and said second and said fourth memory modules are located adjacent to one another without intervening memory modules coupled to other data paths.

2. The memory subsystem as recited in claim 1, wherein each of said plurality of data paths includes 144 data lines.

3. The memory subsystem as recited in claim 1, wherein each of said memory modules are dual in line memory modules (DIMMS).

4. The memory subsystem as recited in claim 1, wherein each of said memory modules is coupled to said memory bus through a connector.

5. A memory subsystem comprising:

a memory controller unit;

a memory bus coupled to said memory controller unit, wherein said memory bus includes a plurality of data paths each formed by a separate grouping of data lines;

a first plurality of memory modules coupled to said memory bus that provide storage corresponding to a first memory bank, wherein said first memory bank is configured to store data corresponding to a first range of addresses; and a second plurality of memory modules coupled to said memory bus that provide storage corresponding to a second memory bank, wherein said second memory bank is configured to store data corresponding to a second range of addresses;

wherein a separate memory module of each of said first and said second memory banks is coupled to each data path of said memory bus; and wherein memory modules that are coupled to the same data path of said memory bus are located adjacent to one another without intervening memory modules coupled to other data paths.

6. The memory subsystem as recited in claim 5, wherein each of said plurality of data paths includes 144 data lines.

7. The memory subsystem as recited in claim 5, wherein each of said memory modules are dual in line memory modules (DIMMS).

8. The memory subsystem as recited in claim 5, wherein each of said memory modules is coupled to said memory bus through a connector.

9. A data processing system comprising:

a processor;

a memory controller unit coupled to said processor;

a memory bus coupled to said memory controller unit, wherein said memory bus includes a plurality of data paths each corresponding to a separate grouping of data lines associated with said memory;

a first memory module and a second memory module coupled to said memory bus that provide storage corresponding to a first memory bank, wherein said first memory bank is configured to store data corresponding to a first range of addresses; and a third memory module and a fourth memory module coupled to said memory bus that provide storage corresponding to a second memory bank, wherein said second memory bank is configured to store data corresponding to a second range of addresses;

wherein said first memory module and said third memory module are coupled to a first data path of said memory bus and said second memory module and said fourth memory module are coupled a second data path of said memory bus; and wherein said first and said third memory modules are located adjacent to one another and said second and said fourth memory modules are located adjacent to one another without intervening memory modules coupled to other data paths.

10. The data processing system as recited in claim 9, wherein each of said plurality of data paths includes 144 data lines.

11. The data processing system as recited in claim 9, wherein each of said memory modules are dual in line memory modules (DIMMS).

12. The data processing system as recited in claim 9, wherein each of said memory modules is coupled to said memory bus through a connector.

* * * * *